Patented Oct. 12, 1954

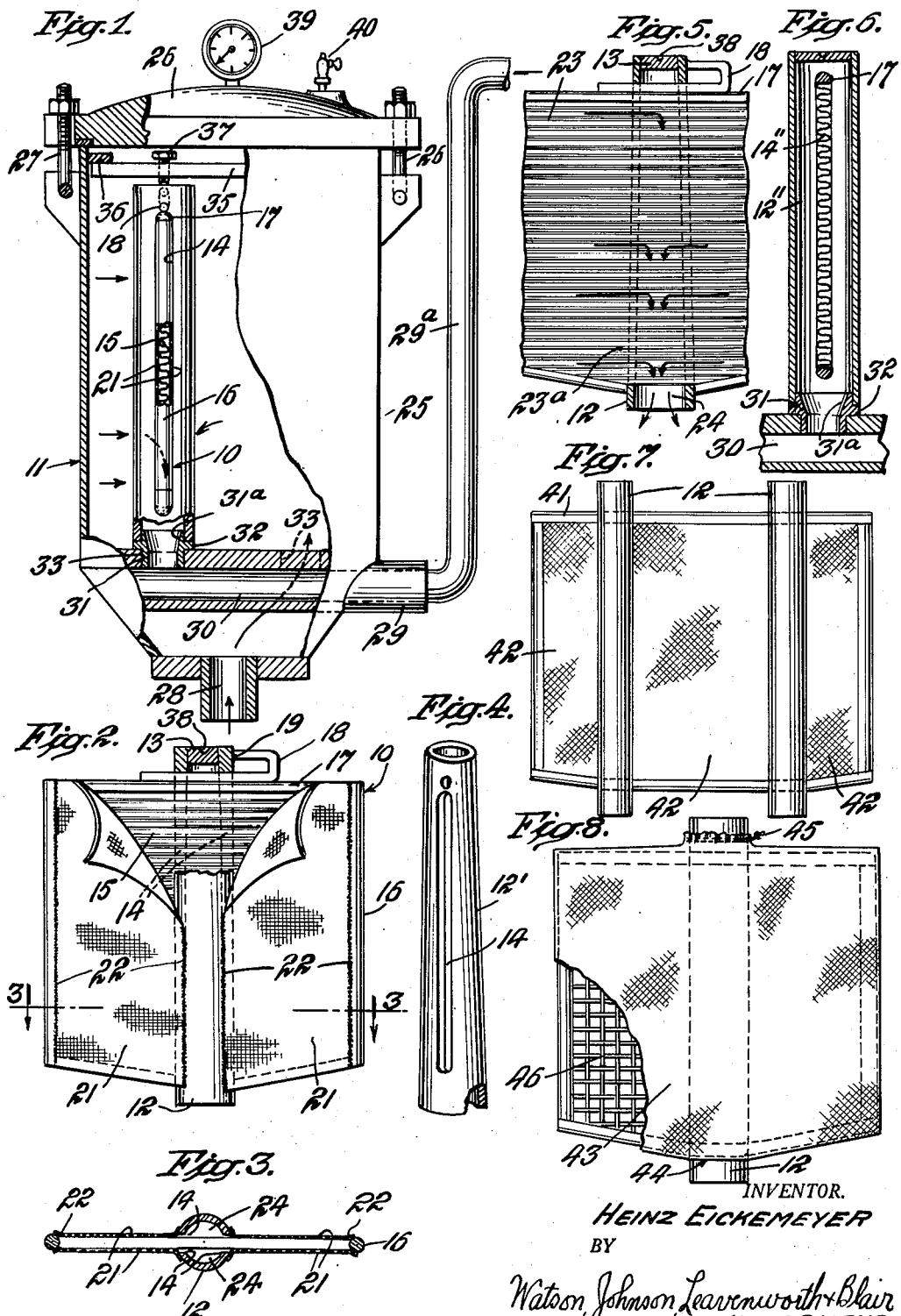

2,691,445

UNITED STATES PATENT OFFICE 2,691,445

FILTERING DEVICE

Heinz Eickemeyer, Wiesbaden, Germany, assignor of one-half to Arvid Langnickel, Cedar Grove, N. J.

Application February 17, 1951, Serial No. 211,516

3 Claims. (Cl. 210—195)

The invention relates to apparatus for filtering liquids and particularly to an improved type of filter leaf adapted to be embodied in such apparatus. This application is a continuation-in-part of my copending application Serial No. 126,221, filed November 8, 1949, now abandoned.

The filter leaf means comprising the invention is especially adapted to be employed in conjunction with filter aids comprising finely divided material such as, for example, asbestos or kieselguhr which is initially caused to be deposited over the surface of the filter meshing forming a filter cake thereon which aids in filtering out microscopically fine particles of the liquid desired to be clarified.

Filter leaves heretofore employed or proposed have commonly been characterized by a non-uniform flow with a concentration at localized areas. These phenomena occurred not only in general operation but in the initial operation of forming the filter cake, and the latter resulted in variations in thickness of the filter cake which thereafter aggravated the differential flow of the liquid being filtered. Furthermore regional differences in the thickness of the filter cake tended to decrease the working capacity of the filter element and efforts to restore the capacity by increased pressure would cause the thinner filter cake areas to work under too high a pressure and to deliver imperfectly filtered liquid. Also under the non-uniform flow and higher pressures fissures tended to form in the deposit at various points permitting inadequately filtered liquid to pass therethrough.

The present invention embodies features and principles of importance in various types of filters particularly those employing filter aids, but it is especially applicable to filters of the butterfly type and the invention will be shown and described as incorporated therein.

The invention is characterized by an arrangement of elements and fluid passages in which the liquid being filtered is positively guided in predetermined paths and the flow is widely and uniformly distributed with uniform differential pressures. Structural features include a vertical supporting tube with wings formed by a supporting sheet such as a section of corrugated material of, for example, metal, glass, porcelain or plastic which extends through slots in the vertical tube as a single sheet and the parts being related such that the fluid passages are smooth and free of shoulders or obstructions liable to cause disturbing currents in the liquid flow. The outer filtering screen is applied directly to the corrugated sheet over the entire areas such that the screens are supported throughout by closely spaced abutments. The liquid is directed inwardly in a general horizontal direction along the corrugations or similar passages of the supporting sheet, and the liquid passages within the vertical tube and the outlet from the vertical tube at the bottom are so proportioned and related that the discharge into the vertical tube from the sides is relatively free and uniform, that is the lower passages in the corrugated sheet are not, for example, favored over the upper passages.

The invention accordingly comprises the features of construction, combination of elements and arrangement of parts, which will be exemplified in the construction hereinafter set forth and the scope of the invention will be indicated in the claims.

For a fuller understanding of the nature and objects of the invention, reference should be had to the following detailed description taken in connection with the accompanying drawing, in which:

Fig. 1 is a general assembly of a filter apparatus with portions of the wall broken away to show the internal elements including a filter leaf of the type embodying the invention;

Fig. 2 is a view in elevation of a form of the filter leaf with portions broken away and the fine mesh filter screen folded away from the central supporting member better to illustrate the construction;

Fig. 3 is a horizontal cross-sectional view taken on the line 3—3 of Fig. 2;

Fig. 4 is a view of a central supporting element of the filter leaf of a form somewhat modified from that shown in the assembly of Figs. 1 and 2;

Fig. 5 is a fragmentary cross-sectional view through the vertical supporting tube taken on the plane of the corrugated sheet adapted to show in somewhat diagrammatic form the uniform flow of the liquid;

Fig. 6 is a cross-section through the central supporting post transverse to the wing portions showing a somewhat modified form of filter leaf;

Fig. 7 is a modified form showing two tubular supporting members; and

Fig. 8 is a view of a filter leaf generally similar to that of Figs. 1 and 2 but employing a different form of inner supporting grid and also a different form of outer fine mesh filter material.

Figs. 2 and 3 depict a filter leaf 10 of a generally butterfly type representative of a preferred form of the invention and Fig. 1 shows the filter leaf embodied in a typical filter mechanism 11. Considering first the details of the filter leaf, it embodies a central tubular supporting member 12 open at the bottom but closed at the top as by means of a plug 13 which may be secured therein in any suitable manner as by welding. The tube has a longitudinal slot passing through the axis thereof or, as may be otherwise described, is provided with two slots 14 located 180° apart. The hollow interior of the tube is tapered increasing in cross sectional area from the top to the bottom for a purpose which will be described below.

Located within the slots and extending radially outwardly is a central supporting sheet 15 of gridlike character. This supporting grid may vary as to exact form dependent upon circumstances. Figs. 1 to 3 disclose an especially advantageous form comprising a corrugated sheet having ridges and corresponding channels extending horizontally, but as described hereinafter it may comprise some other form of grid such as a coarse screen providing it is of a character to ensure the desired uniform flow and distribution. The grid sheet is mounted within and supported in an outer frame 16 which at the side edges may be of round rod stock as shown in cross section in Fig. 3 and at the bottom may be of like shape, the bottom end of the slot 14 having a shape to conform therewith and provide a fluid tight seal. The frame part 17 extending across the top has secured thereto a loop member 18 which is suitably secured to the member 17 as by welding, one end of the member also being secured to the tubular member 12 by welding as shown at 19. The frame carrying the inner supporting grid 15 is thereby secured against lateral displacement and the loop part 18 may be utilized as a means for lifting the filter leaf from its support in a filter tank mechanism.

Secured to the inner supporting sheet 15 on each side of each of the radially extending wing portions is a suitable fine mesh sheet material 21 which may comprise very fine mesh wire screening. Where a metal screen is employed for this purpose it may be secured to the supporting elements in any suitable manner as by soldering or welding as indicated at 22. It will be understood that the screening 21 has been folded back at the top away from the central tubular member 12 in Fig. 2 in order better to show the internal construction, but that normally the inner edges of the screen 21 will be permanently secured directly to the tubular member 12. It will be observed that the screen 21 lies flat against the inner supporting grid 15 throughout the entire areas of the projecting wing portions. In normal operation the liquid to be filtered lies on the outside of the filter leaf and may be under considerable pressure as, for example, up to 70 pounds per square inch gage. In other words there may exist a high differential pressure between opposite sides of the screen material 21, particularly after a substantial deposit has accrued on the outside. The present construction, however, is well adapted to meet such a condition since the opposed wire screens 21 are compressed directly against the intervening grid member 15 over the entire areas of the wing portions and in effect the wire screens 21 are supported throughout by spaced but closely arranged abutment means comprising the elements of the inner grid 15 but without substantial interference with the inward flow of the liquid through the screens 21. Internally of the wing portions the liquid is free to flow radially inward toward the central tubular member throughout the vertical extent, the channels between ridges of the supporting sheet 15 forming a multiplicity of closely spaced horizontal passageways including interstices at the juncture with tubular member 12 providing a corresponding succession of openings into the interior of the tubular member. The exact character of the inner grid 15 may vary depending upon circumstances but in most cases it is desirable to employ a sheet having rather fine corrugations as e. g. spaced $\frac{1}{16}$ or more of an inch apart with a depth substantially greater to afford relatively large fluid channels but closely spaced rigid supporting abutments for the outer screen. It will be understood therefore that it is not attempted to make the spacing of the ridges and other dimensions as shown in the drawings in exact proportions. In the drawings the channels in the sheet are horizontal but as one variation they may slope downwardly toward the central tubular member in the form of a V.

An important feature of the invention is the conception and physical achievement of a filtering means in which the liquid flow is smooth and free of obstructions and uniform throughout the filter. By referring to Fig. 5 it will be seen that the liquid after passing through the outer screens 21 is free to move inwardly along the horizontal channels and that there are no shoulders or sharp bends to cause disturbance of the smooth flow. It will be observed also that the flow is positively guided so as to maintain a uniform distribution as e. g. liquid at an area such as that at 23 in Fig. 5 must first flow inwardly along the horizontal channels until it reaches the vertical passageways 24 where it is released to flow downwardly as indicated by the arrows, and is not permitted to move directly toward the outlet at the bottom of the tube 12 with consequent concentration of liquid flow at such areas as that indicated at 23a. It will be understood also that normally the liquid from the lower horizontal channels into the vertical passages 24 might predominate and jam the passages 24 preventing as free a discharge from the upper horizontal channels into the passages 24 at the top. The lower channels would also be favored by the small increase in pressure head. These conditions or results are minimized in the present construction by providing the tube 12 with a tapered bore increasing in area toward the bottom. In Figs. 1 and 2 this is accomplished by variation in wall thickness and the outer diameter remains constant. In the modified form of Fig. 4, the wall of the tube 12' is of uniform thickness and both the bore and the outer surface are tapered.

This last mentioned condition may also be met by a construction such as that indicated in Fig. 6 in which the vertical tube 12'' has a straight bore but of ample capacity to handle the discharge from the horizontal channels of the grid 14'' and having a cross sectional area greater than that of the collecting passage in the tube 30 at the bottom.

Fig. 1 shows a typical form of filter apparatus in which the filter leaf just described is adapted to be employed. This particular apparatus includes a shell 25 having a cover 26 hermetically sealed to the shell by means of, for example, clamp bolts 27. A liquid inlet 28 at the bottom communicates with the general interior of the shell 25 and one or more outlets 29 for the filtrate communicate with suitable pipes or fluid conduits such as that shown at 30, upon which are mounted the filter leaves 10. It will be understood that the container may be adapted to embody any number of the filter leaves dependent upon the conditions and particularly the capacity desired. Fig. 1 shows only one of such filter leaves which will be sufficient for illustration. As previously indicated the filter leaf is adapted to be set over or into an opening communicating with the channel 30. For this purpose, if desired, the lower end of the tubular member 12 may be provided with a nipple 31 which has a flange 32 forming an abutment adapted to rest on the flat upper surface of the supporting conduit 30 and also forming an abutment against which rests the lower end of the tubular member 12. Suitable flexible washer or gasket means may be employed when preferred to insure a good seal. The bore of the nipple 31 is provided with a smooth radius 31a which merges into the interior surface of the tube 12 to avoid any turbulence in the liquid flow at that point. Normally the filter leaves may be freely supported within the openings 33 of the channel means 30, being held there by gravity and a preponderance of external pressure when in use, and the leaves may be freely lifted out for cleaning or replacement. If desired, however, the upper ends may be guided and supported by means of a bar 35 having its opposite ends located under supporting flanges 36 and having set screws 37 adapted to be threaded into engagement with a central depression 38 in the upper end of the respective tubular member 12. The filter apparatus may be equipped with conventional features such as a pressure gage 39, and a valve 40 for releasing air pockets.

The outlet pipe 29a extends upwardly and discharges at a point above the cover of the filter tank. In initiating operation the valve 40 is kept open until the tank is full. With the discharge point through pipe 29a located as described, discharge cannot occur until the tank becomes filled at which time the valve 40 is closed and the tank thereafter during operation remains filled. It will be apparent that the liquid will flow inwardly through the screens 21 throughout their entire area from top to bottom and there will be a uniform distribution of flow and a uniform deposit on the outer surface as distinguished from a concentration of flow in and about the lower part of the filter leaf and particularly adjacent the lower end of the central member 12 such as occurs in constructions heretofore common.

Fig. 7 shows a modified form of filter leaf similar, however, to that of Fig. 2 except that it embodies two of the tubular members 12 and has a continuous frame 41 extending through both of the tubular members 12 so as to form in effect a double butterfly filter, the fine mesh filter screen 42 being applied in sections to the right and left wing portions and also the central portion between the two tubular members.

As heretofore indicated the fine mesh porous material employed as the outer filtering element may vary dependent upon the circumstances and in Fig. 8 there is shown a filter leaf similar to that of Fig. 2 but having applied thereto an outer filter means comprising in general arrangement a fabric bag 43 having an opening 44 at the bottom to permit the projection therethrough of the lower end of the tubular member 12 and being provided at the top with a drawstring means 45 whereby it may be closely drawn together and closely tied around the upper projecting stem of the tubular member 12. In this figure there is also shown a different structural form of inner supporting grid 46 comprising a coarse wire screen.

Since further changes and embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. A filter leaf comprising a hollow vertical tubular supporting member having opposed longitudinal slots in the wall thereof, a corrugated sheet extending into and through said member and occupying said slots with wing portions extending radially therefrom, fine mesh sheet material fitted to each side of each of said wing portions and adapted to be supported directly thereon, the corrugations of said sheet extending in a radial direction into the interior of said member and arranged to provide smooth unobstructed channels for the free flow of liquid inwardly to the interior of said member, a liquid withdrawal duct connected to the bottom of said member, the hollow interior of the latter being of a size to provide relatively large vertical fluid passages of a capacity at least equal to that of said duct and also to the total capacity of said channels.

2. A filter leaf comprising an elongated hollow supporting member provided with a fluid outlet at one end and opposed longitudinal slots, a grid sheet extending through said member and occupying said slots providing wing portions extending radially from said supporting member, said wings having supporting frames extending around the edges, fine mesh sheet filtering material applied to each side of each of said wings and sealed to said supporting frames and to said supporting member along the respective junction lines of said wings and said supporting member, said filtering material being supported in a flat continuous manner directly on the inner grid sheet throughout the entire side areas of said wings, said grid sheet being of a construction to provide channels extending radially of said member, said channels extending inwardly to the hollow interior of said member and including continuing unrestricted liquid passageways through the respective said slots equal in cross-sectional area to the cross-sectional area thereof in the outer wing portions.

3. A filter means comprising a vertical tubular supporting member having opposed vertical slots in the wall thereof, a wing element comprising a grid extending through said vertical member and occupying said slots and providing flat wing members extending radially from said tubular member in opposite directions, fine mesh sheet filtering material fitted to and covering each side of each of said wings and adapted to be supported directly thereon, said grid having radial channels extending into the interior of said member throughout the junction of said grid with said supporting member affording a free but directed uniform flow of liquid into the interior thereof, the hollow interior of said supporting member progressively increasing in cross-sectional area downwardly and providing vertical passages of correspondingly increasing area adjacent said grid for the unrestricted removal of liquid.

References Cited in the file of this patent

UNITED STATES PATENTS

| Number | Name | Date |
|---|---|---|
| 776,024 | Hatschek | Nov. 29, 1904 |
| 2,002,826 | Moran | May 28, 1935 |
| 2,023,910 | Bacheldor | Dec. 10, 1935 |
| 2,300,789 | Kelley | Nov. 3, 1942 |
| 2,381,462 | Naugle | Aug. 7, 1945 |
| 2,392,537 | Klopfenstein | Jan. 8, 1946 |
| 2,597,235 | Ericson | May 20, 1952 |

FOREIGN PATENTS

| Number | Country | Date |
|---|---|---|
| 338,567 | Great Britain | Nov. 17, 1930 |